June 15, 1965  C. DOMENIGHETTI  3,189,327
MOBILE BATCHING AND MIXING PLANTS
Filed May 16, 1961  2 Sheets-Sheet 1

INVENTOR
COSTANTE DOMENIGHETTI
BY *Irwin S. Thompson*
ATTORNEY

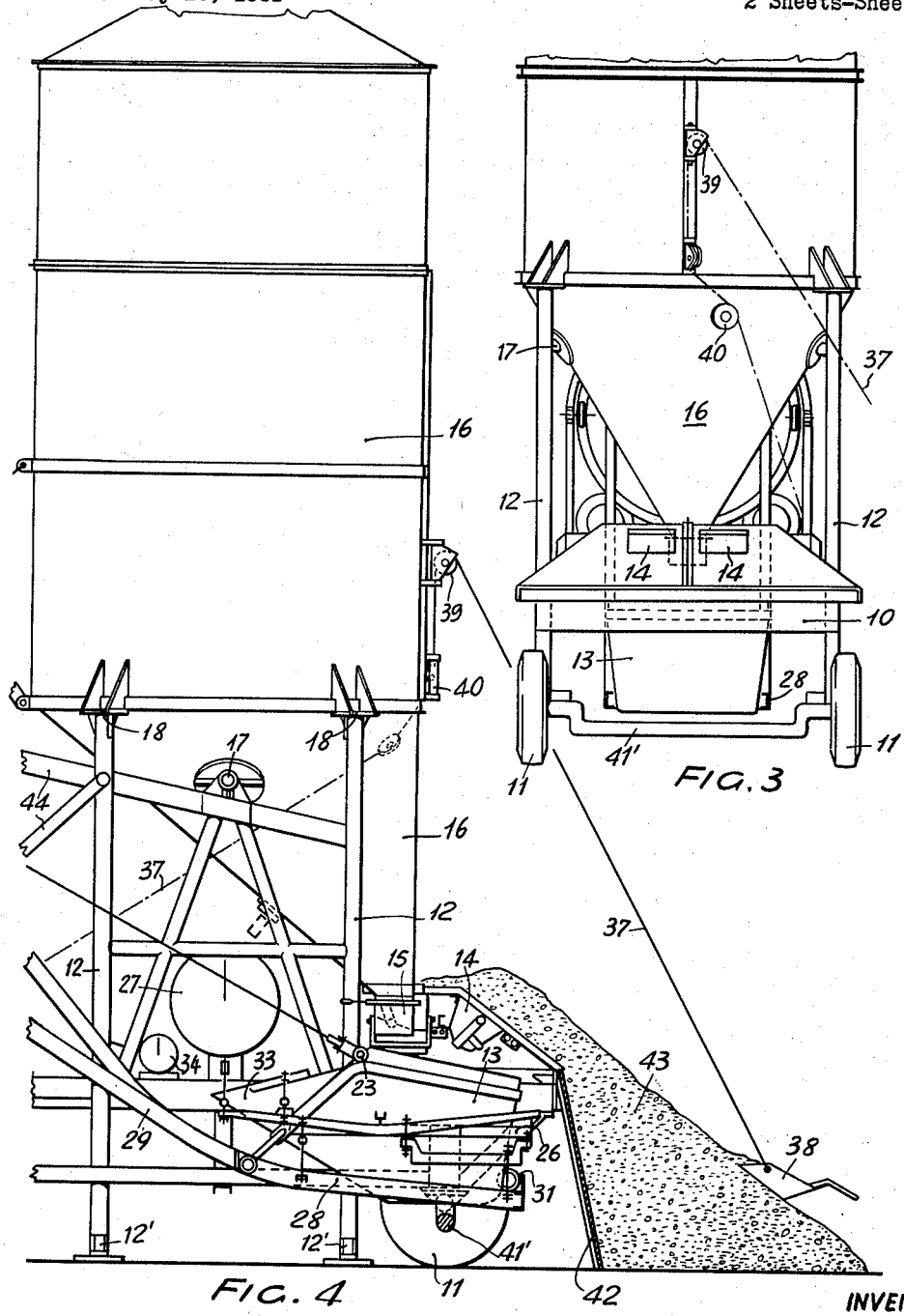

3,189,327
MOBILE BATCHING AND MIXING PLANTS
Costante Domenighetti, Piazzale Giulio Cesare 20, Milan, Italy
Filed May 16, 1961, Ser. No. 110,388
Claims priority, application Italy, June 24, 1960, 11,268/60; Patent 623,601
1 Claim. (Cl. 259—164)

The present invention relates to mobile batching and mixing plants for mixture components and especially for concrete components.

The general object of the present invention is to provide a mobile batching plant which is especially suited for producing batched concrete mixtures or alternatively any mixture the components of which are quantitively established, the arrangement and dimensions of the parts comprising the plant permitting a rapid and direct reciprocal operative relation to form a compact unit which complies with the authorized road traffic regulations without any special permission being necessary to transport the plant from one work-site to another.

The present invention consists in a mobile batching and mixing plant for mixture components and especially for concrete components wherein it comprises a trailer chassis or mobile carrying frame mounted on wheels and provided with supporting and fastening struts or legs of variable length on which is mounted an overturnable hopper for bulk or dust-like material, a movable container for lifting the mixture components, said movable container also acting as a weighing container, a weighing device with dial indicators, a supporting track for the movable container consisting of two separate sections whereby the lower section forms a part of the weighing system while the upper section is fixed to the frame, discharge ports for the material contained in the movable container, at least a mechanical towed hand-guided scraper for approaching and feeding the coarse aggregates, a liquid meter inserted in the pipings feeding the liquids required for the mixture, a mechanical mixer, a winch for operating the overturning of the hopper and the lifting of the movable container.

It is a further feature of the invention that the charging and lifting movable container for the materials also serves as a weighing container and in that the bulk cement hopper may be overturned during the transportation of the machine and lifted and lowered by the same winch operating the movable container lifting the materials.

Figure 1:
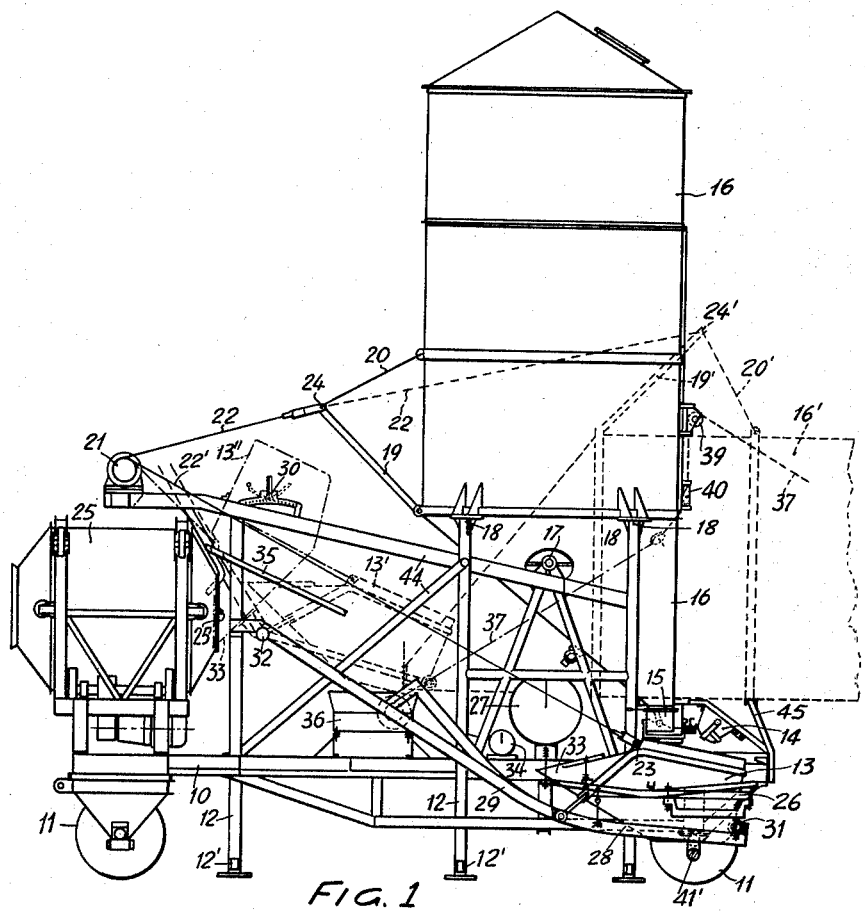
Figure 2:
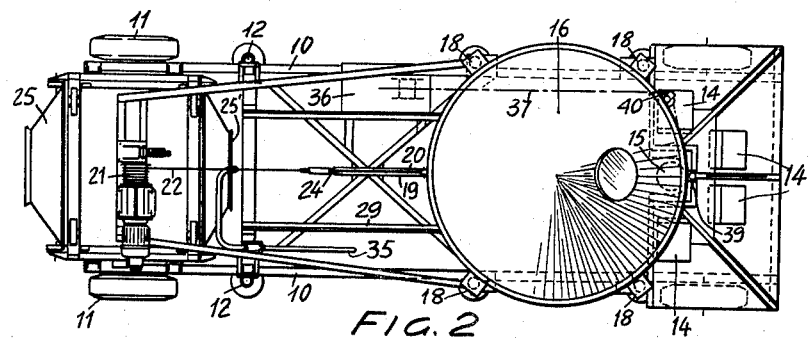

The invention will now be described, by way of example only, with reference to the accompanying drawings, wherein:

FIGURE 1 is a side view of the plant;
FIGURE 2 shows a plan view of FIGURE 1;
FIGURE 3 shows a rear elevation of the plant; and
FIGURE 4 shows a detail of FIGURE 1 on an enlarged scale.

As shown in the drawings the complete plant comprises a trailer chassis or mobile carrying frame 10 mounted on wheels 11 and provided with legs 12, which may be extended for instance by means of screw threaded extensions 12'. The frame of said trailer chassis carries mounted thereon several component parts forming a single unit, including a weighing movable container 13 over which charging ports 14 are provided for the coarse materials while the port 15 is for the bulk material coming from a hopper 16.

The corners of the weighing movable container 13 are rounded off for facilitating the total discharge of the material into a mixer 25; furthermore the discharge opening of the movable container has the form of funnel or chute portion 33 for entering into the opening 25' of the mixer 25 thus rendering superfluous any other intermediate funnel means; the portion 33 of the movable container 13 carries mounted thereon a conventional vibrating member (not shown) provided for ensuring a rapid and complete discharge of the material into the mixer 25.

The vibrating member (not shown) is preferably started through the closing of electric contacts operated by the movable container on its arrival at the mixer at the end of its travel. The trailer chassis 10 carries mounted thereon the hopper 16 supported on diametral pins 17 which enable it to be overturned to the horizontal position 16' shown by dotted lines in FIGURE 1. During operation the hopper supported in a fixed vertical position by supports 18 which are partly mobile for permitting the overturning of the hopper. The outer surface of the hopper 16 carries fixed thereto a strut 19 and the relative tie rod 20 which in the overturned position 16' of the hopper 16 (shown by dotted lines) are indicated by 19' and 20'; in said overturned position the hopper is supported by a profiled piece 45 which may have the form of a cradle or any other form which can be more suitable to this scope, said profiled piece 45 co-operating with the pins 17 to stabilize the unit and being removable when the plant is operating and the hopper is in the upright position.

The overturning of the hopper 16 is provided for reducing the height of the plant so that it does not exceed the height allowed by the road traffic regulations during the displacement of the plant from one work site to another. The overturning is effected by means of a rope or cable 22 and the winch 21 which also serves for the lifting of the charging movable container 13. The rope 22 is hooked in a position 23 on the movable container 13 for lifting it upwards and in this position the rope 22 is indicated by 22'. When the rope 22 serves for the lifting of the hopper 16, it is hooked at the intersection point 24 of the strut 19 and of the tie-rod 20. Upon a certain given lift displacement of the movable container 13 occurs, to the position 13' (shown by dotted lines), whereby its back portion is partially lifted to start it overturning which is completed when the movable container reaches the higher position 13" (shown by chain-dotted lines) for the discharge of the material into the mixer 25.

It will thus be appreciated that hopper means are provided including a chute extending downwardly away from the mixer means, and that the hopper means are mounted for vertical swinging movement about a horizontal axis such that the hopper means in an upright position has its center of mass above that axis and on the side of that axis opposite the mixer means, so that the hopper means overbalances to the side opposite the mixer means. It will also be apparent that that axis is disposed a substantial distance above the lower end of the chute, and that means are provided for swinging the hopper means upwardly about that axis and toward the mixer means and into an upright operative position, and for lowering the hopper means under the influence of its overbalanced weight so that the hopper means swings downwardly about that axis and away from the mixer means and into a lowered position for transportation. It will also be seen that means are provided for releasably retaining the hopper means in that upright position.

The system comprising the weighing machines or scales 26 with relative dial 27 is mounted in the inside of the frame 10 and supports the lower portion 28 of a slide track of the movable container 13; the remaining part 29 of the track is separated from the portion 28 and is fixed to the frame 10. In this manner the material charged into the movable container 13 is weighed at the moment at which the movable container is supported by the track section 28 forming part of the weighing machine or scale 26. Upper end travel controls 30 and possibly lower end travel controls 31 permit an automatic up down motion with relative overturning of the movable container 13 at the end of its travel and the discharge of its contents into the mixer.

In its upper position the movable container 13 rotates about a pivot pin 32, the position of which allows the direct introduction of the movable container opening 33 into the mixer opening 25' and thereafter the discharge of the material contained in said movable container directly in the inside of the mixer 25 without need of any auxiliary funnel means.

A liquid meter 34 with an inlet tube 35 feeds the required amount of liquid for the mixture into the mixer 25 thus enabling the batching of the liquid. A motor-driven winch 36 operates on a rope 37 to actuate a hand guided towed scraper 38 for carrying the coarse aggregates above the ports 14 by passing over hinged pulleys 39 and 40.

The central portion 41' of the back axle 41 of the trailer chassis 10 is bent downwards to provide a free space for the movable container 13 and the relative scales thus allowing for the reduction in the height of the charging ports 14 and 15 for the movable container 13. Detachable plates 42, shown in FIGURE 4, prevent the coarse aggregates or materials collected in a pile 43 by the scraper 38 from falling against the mechanisms of the movable container 13 and of the weighing machines.

The trailer chassis or mobile frame 10 is reinforced by vertical and horizontal diagonal framework 44.

The operation of the plant takes place in the following manner:

The plant towed by a driving machine arrives on the work-site with the hopper 16 overturned in the horizontal position 16' and the rope 22' of the winch 21 attached at 23 to the movable container 13. This rope 22' is detached from the movable container and applied in the position 24' to the strut 19' which is in the location corresponding to the overturned hopper. By operating the winch 21 in traction the hopper rotates about the pins 17 and stands up in its upright position. At this point the rope 22 of the winch 21 is detached from the position 24 and attached at 23 to the movable container 13 while the hopper is fixed in its upright position with bolts provided at 18 at the upper ends of the supporting legs 12. Before starting any operation of the plant the supporting legs 12 are subjected to tension by unscrewing the screw threaded extensions 12' which are lowered and become fixed on the ground so that the plant stays lifted up with respect to the wheels 11 which only serve for the transportation of the plant. The discharge opening 15 of the hopper 16 is situated above the movable container 13 as clearly shown in the drawings, the movable container 13 being placed below the discharge openings 14 for the coarse materials. The required quantity of coarse material (sand or gravel) is then brought near the plant at the location 43. The mechanical scraper 38 carries these materials upwards and forms a pile above the ports 14. By observing and reading on the scales the worker partially discharges every single port by introducing into the movable container 13 which at this moment is on the weighing track section 28 the necessary quantities of coarse components through the ports 14 and of bulk like components through the port 15. When the exact weight has been reached the worker operates the winch 21 which pulls the movable container 13 up to the position 13 or 13' for discharging it into the mixer 25 or any other mixing apparatus. Upon discharge of the movable container 13 it returns to the lower position and the cycle starts over again. The quantity of liquid necessary for the mixing is proportioned by the meter 34 and is added into the mixer through the meter 34 and its associated piping 35. When the mixing has been completed the operator effects the discharge in the usual manner.

What I claim is:

A mobile batching and mixing unit for mixing components comprising frame means, wheel means connected to said frame means for moving said unit from place to place. Mixer means mounted on one end of said frame means, hopper means mounted on the other end of said frame means for storing material therein, said hopper means including a chute extending downwardly away from said mixer means, inclined track means on said frame means sloping from below said chute upwardly to said mixer means, movable container means mounted on said track means for movement back and forth to transfer material from said hopper means to said mixer means, means mounting said hopper means for vertical swinging movement about a horizontal axis such that said hopper means in an upright position has its center of mass above said axis and on the side of said axis opposite said mixer means whereby said hopper means overbalances to the side opposite said mixer means, said axis being disposed a substantial distance above the lower end of said chute, means for swinging said hopper means upwardly about said axis and towards said mixer means and into an upright operative position and for lowering said hopper means under the influence of its overbalanced weight so that said hopper means swings downwardly about said axis and away from said mixer means and into a lowered position for transportation, and means for releasably retaining said hopper means in said upright position.

References Cited by the Examiner
UNITED STATES PATENTS

| | | | |
|---|---|---|---|
| 1,344,459 | 6/20 | Sweet et al. | 214—2 X |
| 2,493,898 | 1/50 | Pollitz | 259—154 |
| 2,703,227 | 3/55 | Hughes | 259—167 |
| 2,867,336 | 1/59 | Soldini et al. | 214—2 |
| 2,873,036 | 2/59 | Noble | 214—2 |
| 2,945,683 | 7/60 | Martinson | 259—159 |

FOREIGN PATENTS

| | | |
|---|---|---|
| 1,181,410 | 1/59 | France. |
| 1,249,157 | 11/60 | France. |
| 548,573 | 10/42 | Great Britain. |

WALTER A. SCHEEL, *Primary Examiner.*

JAMES S. SHANK, *Examiner.*